(12) United States Patent
Kisel et al.

(10) Patent No.: US 8,166,148 B2
(45) Date of Patent: Apr. 24, 2012

(54) METHOD FOR DISTRIBUTING CONTENT DATA PACKAGES ORIGINATED BY USERS OF A SUPER PEER-TO-PEER NETWORK

(75) Inventors: Andrey Kisel, Maidenhead (GB); Dave Cecil Robinson, Woodsend Aldbourne (GB)

(73) Assignee: Alcatel Lucent, Paris (FR)

( * ) Notice: Subject to any disclaimer, the term of this patent is extended or adjusted under 35 U.S.C. 154(b) by 181 days.

(21) Appl. No.: 12/336,249

(22) Filed: Dec. 16, 2008

(65) Prior Publication Data

US 2009/0198833 A1  Aug. 6, 2009

(30) Foreign Application Priority Data

Dec. 17, 2007 (EP) .................................... 07291559

(51) Int. Cl.
*G06F 15/173* (2006.01)
(52) U.S. Cl. ........................ 709/223; 709/242
(58) Field of Classification Search .................. 709/223, 709/242
See application file for complete search history.

(56) References Cited

U.S. PATENT DOCUMENTS

| | | | | |
|---|---|---|---|---|
| 6,795,815 | B2 * | 9/2004 | Zhang | 706/46 |
| 2004/0103437 | A1 | 5/2004 | Allegrezza | |
| 2005/0091289 | A1 * | 4/2005 | Shappell et al. | 707/201 |
| 2006/0165014 | A1 * | 7/2006 | Ikeda | 370/254 |
| 2008/0089299 | A1 * | 4/2008 | Lindsley et al. | 370/338 |

FOREIGN PATENT DOCUMENTS

EP  1 284 576 A2  2/2003

OTHER PUBLICATIONS

Kalogeraki V. et al., "Handling Multimedia Objects in Peer-to-Peer Networks," Cluster Computing and the Grid 2$^{nd}$ IEEE/ACM International Symposium CC GRID2002, 2 pages, May 21, 2002.

Doulamis N. et al., "Optimal Decomposition of P2P Networks Based on File Exchange Patterns for Multimedia Content Search & Replication," Proceedings of the ACM International Multimedia Conference and Exhibition—Proceedings of the 9$^{th}$ ACM Sig Multimedia International Workshop on Multimedia Information Ret., pp. 125-134, Sep. 2007.

* cited by examiner

*Primary Examiner* — Kenny Lin
*Assistant Examiner* — Farhad Ali
(74) *Attorney, Agent, or Firm* — Fay Sharpe LLP

(57) ABSTRACT

A method for distributing content data packages 7 originated by users of a super peer-to-peer network is proposed, wherein the content data packages 7 are to be cached in caching nodes CN1,CN2,CN3,CN4 of said network. The network comprises a plurality of caching nodes CN1,CN2,CN3,CN4 and user nodes 5 of said users and a plurality of data lines that extend between adjacent of said nodes and the users are being grouped in user groups and listed in a user group list. Content data traffic is to be delivered on traffic connections between user nodes 5 of the network. The method comprises the steps of:

a) receiving a request for uploading an upload content data package 7 from a requesting user of the users by an agent network node of said network, b) looking up all user group members of the users being member of a current user group UG1 of said requesting user in said user group list and determining the user nodes of said user group members, c) determining in which of the caching nodes CN1,CN2,CN3, CN4 of the network said upload content data package 7 is to be cached by applying a decision matrix, wherein said decision matrix defines a relationship defining at which caching node content data packages 7 have to be cached for which user node, d) caching said upload content data package 7 in the determined caching nodes CN1,CN2,CN3,CN4.

11 Claims, 2 Drawing Sheets

METHOD FOR DISTRIBUTING CONTENT DATA PACKAGES ORIGINATED BY USERS OF A SUPER PEER-TO-PEER NETWORK

BACKGROUND OF THE INVENTION

The invention relates to a method for distributing content data packages originated by users of a super peer-to-peer (sP2P) network, wherein the content data packages are to be cached in caching nodes (superpeers) of said network. The network is comprising a plurality of caching nodes and user nodes (peers) of said users and a plurality of data lines that extend between adjacent of said nodes for transmitting said content data packages.

Known solutions for Internet Protocol Television (IPTV) content distribution model use real-time content distribution technique from a central library server to streaming servers.

Commonly, e.g. in a closed network, IPTV solutions place all the content at the centralised library server or ingest live content at a small number of ingest points. A Content Distribution Network (CDN) is later used to distribute the content from the library server to streaming servers close to the network edges. If a user wants to view the content that is not available at the edge streaming server, the request is either served by the library server or rejected.

Another known technique is called 'stream through'. According to the technique, if the content is not available at a streaming server (Streamer Array), streamer arrays request in real-time content segments from the library server (Vault Array). Then the streamer immediately delivers the content down to the Peer requesting the content, e.g. to a Set Top Box (STB) and caches it for subsequent requests, which are served from the cache. Some optimizations are applied, e.g. pro-active cache filling.

In the stream through technique proprietary distribution and streaming servers often deployed over private network are used to guarantee the required high quality of the real-time segments distributions. This solution is designed for quick distribution of high popularity assets loaded onto the centralised storage, i.e. the Vault Array, and is not well suited for community and user originated content, which can generate small but relatively steady number of requests. For example, when a large number of user originated assets is created and initially uploaded onto the library server, the solution is likely to deny service or reduce the service quality due to several bottlenecks:

the maximum number of segment requests which the library server can sustain for a large number of assets;
the network Bandwidth (BW) required to move on-demand user originated content with high-quality;
the speed of cache invalidation for the streaming array for large number of user originated assets.

There are also known asset sharing IPTV applications. They allow users to upload their asset to the centralised server for sharing. However, delivering all user generated assets from the centralised server even over closed networks is expensive and creates bottleneck.

Open Internet sP2P networks, typically used for asset sharing, are emerging as alternative content delivery mechanisms for on-demand IPTV services, such as content on demand (CoD), broadcast TV (bTV), push Call of Duty (CoD).

A sP2P network provides caching servers enabling fast access to frequently requested WEB pages or files. Super Peer-to-Peer networks or caching overlay networks are also known as managed on-demand content delivery networks. Therefore, the terminology is interchangeable. Caching servers or caching overlays are common with Internet Service Providers (ISP), enabling efficient access to frequently visited web sites. Similarly, multimedia caching servers are being considered to speed up access to the frequently requested multimedia assets and reduce the network overload.

However, existing approaches consider sP2P optimisations for the operator originated multimedia (CoD, bTV, push CoD). Approaches based upon caching of 'frequently requested' multimedia does not always work with user originated content due to potentially small overall number of requests.

Another known solution for sP2P video delivery is called Edge Suite Streaming (AESS). AESS comes close to the model of distributed Video on Demand (VoD) streaming. Live broadcast or media on-demand content streams are delivered over the internet to set or caching edges. Caching edges are located close to the end users, i.e. close to the Peers, and used to serve requested content.

AESS on-demand service downloads a stream of data packages from storage and transfers it reliably to the streaming servers at the edges over the Internet before streaming begins to the user equipment, i.e. to the Peers. Some optimisations are applied for transferring the stream to the streaming server and for the selection of the streaming servers, e.g. for live broadcast services multiple copies of the same stream are sent over different routes from an entry point to the edge streaming servers over the Internet. Therefore, because of the fact that this "multiple copies of the same stream over different routes solution" requires multiple high BW copies which consume significant amount of resource, scaling up requires exponential infrastructure upgrades. So this solution is not well suited for user originated content.

The AESS solution is based upon using sP2P network and is potentially suited for user originated content. However, the existing reactive caching based upon 'frequency of requests' is not well adapted for maximising service quality when used with user originated content. This is because overall frequency of requests for user originated content is likely to stay relatively low.

Another drawback of using the known sP2P approach to distribute user originated content is that it does not take into account content properties, e.g. required service reliability, priority, etc. For example, the known sP2P approach it is not well suited for distribution of user originated content with relatively low usage frequency but very high value to a number of scattered users.

SHORT DESCRIPTION OF THE INVENTION

According to the inventive method for distributing content data packages originated by users of a super peer-to-peer network, the content data packages are to be cached in caching nodes of said network. The network is comprising a plurality of caching nodes and user nodes of said users and a plurality of data lines that extend between adjacent of said nodes, wherein content data traffic is to be delivered on traffic connections between user nodes of the network. The users are being grouped in user groups (UG) and listed in a user group list. In case of the inventive method a wide meaning of "data package" is used, including a piece of content or a whole content. Traditionally "data package" is associated with a small amount of data, e.g. a User Datagram Protocol (UDP) packet. This is a small unit for building popularity density, alternatively a larger segment or a whole piece can be evaluated for popularity and cached and/or distributed.

The inventive method is comprising the following steps:

a) receiving a request for uploading an upload content data package from a requesting user of the users by an agent network node of said network, b) looking up all user group members of the users being members of a current user group of said requesting user in said user group list and determining the user nodes of said user group members, c) determining in which of the caching nodes of the network said upload content data package is to be cached by applying a decision matrix, wherein said decision matrix defines a relationship defining at which caching node content data packages have to be cached for which user node, d) caching said upload content data package in the determined caching nodes.

Preferred embodiments of the invention provide a method for distributing content data packages originated by users of a super peer-to-peer network, which overcomes at least one of the problems associated with the related art, in particular which improves efficiency and service quality for delivering user originated content over opened caching overlay networks, e.g. sP2P or Internet.

A solution according to the inventive method adapts sP2P for efficient distribution of user originated content and improves both efficiency and service quality over the sP2P, e.g. the Internet. It takes into account properties of the content and enables high quality and reliable delivery for high value assets, e.g. for corporate, financial or military user originated content.

The inventive method optimises sP2P and/or open internet networks for on-demand services using user-generated content. The inventive method improves efficiency and service quality in a managed on-demand content delivery network for distribution of user originated content.

The inventive method is leading to an implementation of a combination of the following two ideas:

The first idea is to introduce 'user groups'. A user group is a group of users, e.g. with similar profile, common interests, family or work ties, etc. User groups can be managed by the users themselves, a system operator or alternatively derived in an automated way from analyzing user behavior. Optionally, content originated by the UG member can be restricted to other UG members only.

The second idea is to pro-actively fill the caches close to UG members with the content originated from another UG member. The decision matrix is used to evaluate needs for cache filling. Other UG members can be optionally notified about new originated content after it has been processed, e.g. the decision is made to fill the caches and the caches are pre-filled.

The inventive method has the following advantages:

It adapts sP2P for efficient distribution of user originated content;

It improves both efficiency and on-demand service quality for user originated content;

It removes the cost of distributed video servers and high quality core network;

It takes media properties into account for efficient content delivery;

It enables different service levels for different content types;

It allows new revenue generation models for telecom operators in existing open internet networks by providing either overlay networks or servers, e.g. Application Service (AS) or agent;

It scales up and down efficiently.

PREFERRED VARIANTS OF THE INVENTION

A particularly preferred variant of the inventive method is characterized in that the decision matrix lists the caching nodes being adjacent to user nodes as the caching nodes the content data packages have to be cached for the user nodes. Therefore, content data packages which may be requested by a specific user always can be delivered to the specific user directly from a neighbouring caching node without detours.

If the user group members are being notified after the caching of said upload content data package is completed the user group members cannot miss viewing new content which is uploaded from another member of the user group of which they are a member.

In a preferred variant of the inventive method the following steps are performed:

assigning a popularity value of said upload content data package to each caching node having at least one user node of said user group members as an adjacent node, and calculating a weighted request probability for said upload content data package at each caching node.

According to the preferred variant said determining in which of the caching nodes of the network said upload content data package is to be cached by applying said decision matrix is comprising the step of deciding which of the weighted request probabilities of the upload content data package are fulfilling a predefined condition.

Said determined caching nodes are those at which the weighted request probability of the upload content data package fulfils said predefined condition. Said calculating of the weighted request probability for said upload content data package preferably is performed by combining said popularity value with a distance from the respective caching node to the caching node to which the respective popularity value is assigned to. The respective caching node is the one for which the weighted request probability is calculated currently and the respective popularity value is the one which is currently combined with the distance.

Accordingly, a popularity value is applied to decide whether upload content data packages, i.e. media or media segments, should be cached and/or distributed. The ones closest to the user caching node with the weighted highest weighted request probability caches or is selected for caching.

Preferably, the weighted request probability of said upload content data package is calculated by summing up the results of said combining for different caching nodes and/or user nodes. Therefore, data may be cached in nodes without adjacent peers in an appropriate way according to the previously mentioned preferred variant of the inventive method. Any node of the network may be used as a caching node. The caching nodes are defined by the fact that they are caching said content data packages for delivery to at least one of the peers of the network.

In another variant of the inventive method a content priority value, preferably defining a content value, is assigned to said upload content data package and said decision matrix defines at which caching node content data packages have to be cached for which user node if said content priority value fulfils a predefined priority condition, preferably exceeds a minimum priority value. Accordingly, only high priority assets are distributed and a network overload can be avoided.

If said decision matrix defines at least two caching nodes, the content data package is to be cached for each user node if said content data fulfils said predefined condition, for high priority assets a redundant caching is made possible to ensure access to the assets.

If the weighted request probabilities for content data packages is requested and/or updated from external sources, preferably from said data library server, a centralised management of the content data package distribution is made possible.

Preferably, above steps of the inventive method are performed by said agent network node. Therefore, an existing network can be adapted easily to perform the inventive method.

Also within the scope of the invention is a computer program comprising means for performing the inventive method when run and/or stored on a computer system.

Further advantages can be extracted from the description and the enclosed drawing. The features mentioned above and below can be used in accordance with the invention either individually or collectively in any combination. The embodiments mentioned are not to be understood as exhaustive enumeration but rather have exemplary character for the description of the invention.

DRAWINGS AND DETAILED DESCRIPTION OF THE INVENTION

The invention is illustrated in the drawings.

The FIGS. 1 illustrate an example of an Internet sP2P network being arranged to perform the inventive method. Several caching nodes (CN1, CN2, CN3, . . . ) called Superpeers and peers 5, i.e. user equipment for example comprising an IPTV STB are shown. As an example a user group 1 (UG1) is shown, the members of which are denoted by circles with shades and dotted lines connected to UG1. Furthermore, an application server (AS) providing interfaces to applications for sharing user originated content and an agent for pre-active cache population are shown, which serve as an example for an agent network node. For completeness of the sP2P a commercial content storage node (library server) is illustrated.

Figure 1A:
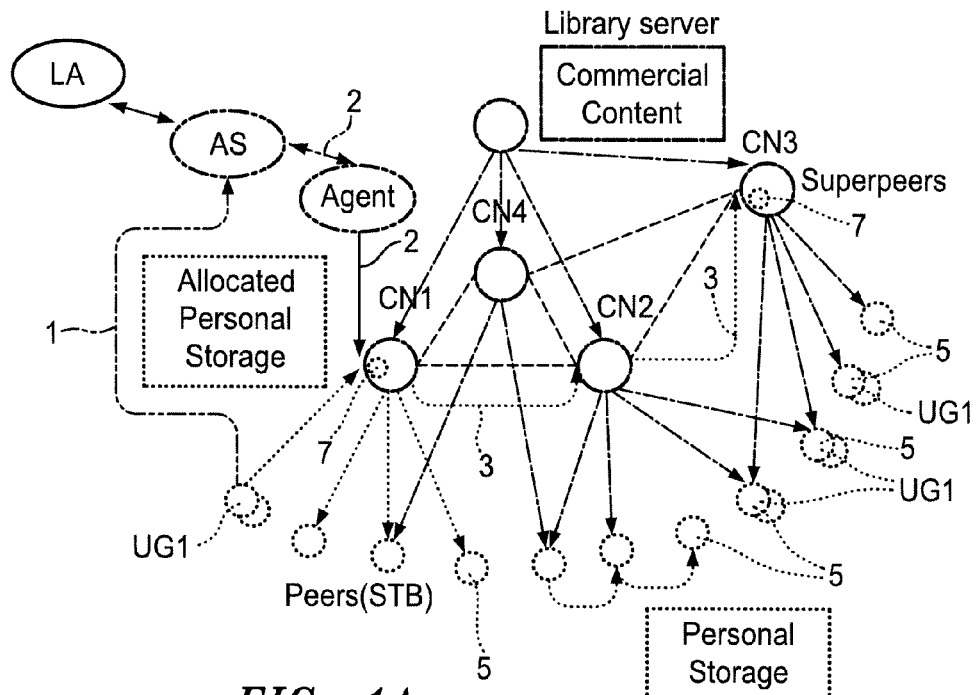
FIG. 1a illustrates a first variant of the inventive method adapting Internet sP2P for efficient distribution of user originated content.
Figure 1B:
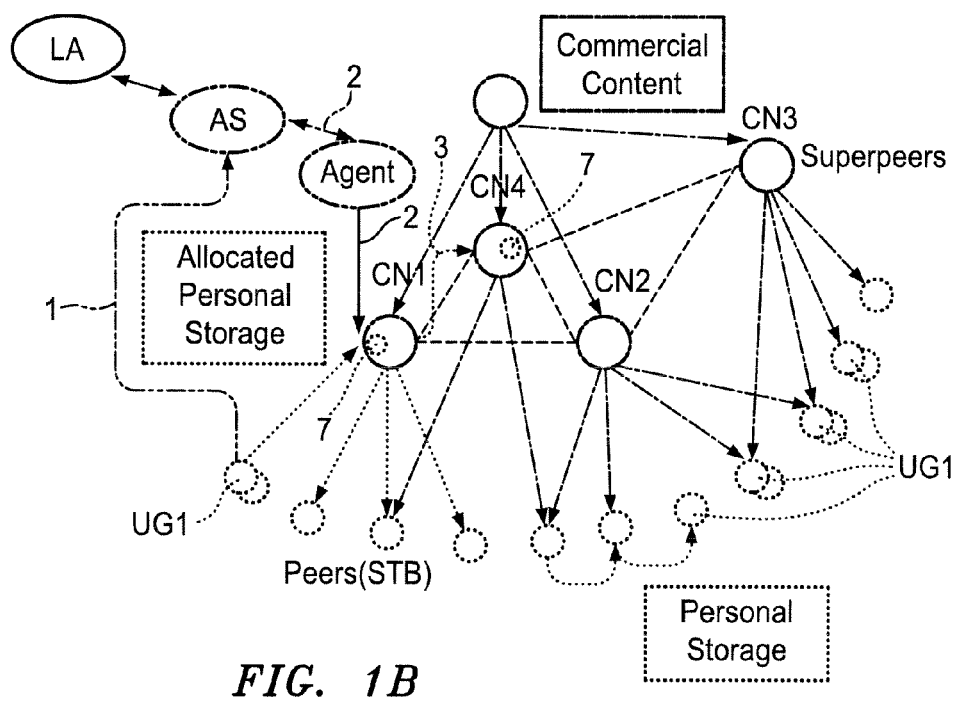
FIG. 1b illustrates an example of the inventive method which uses popularity density among UG members for deciding how to distribute user originated content.
Figure 1C:
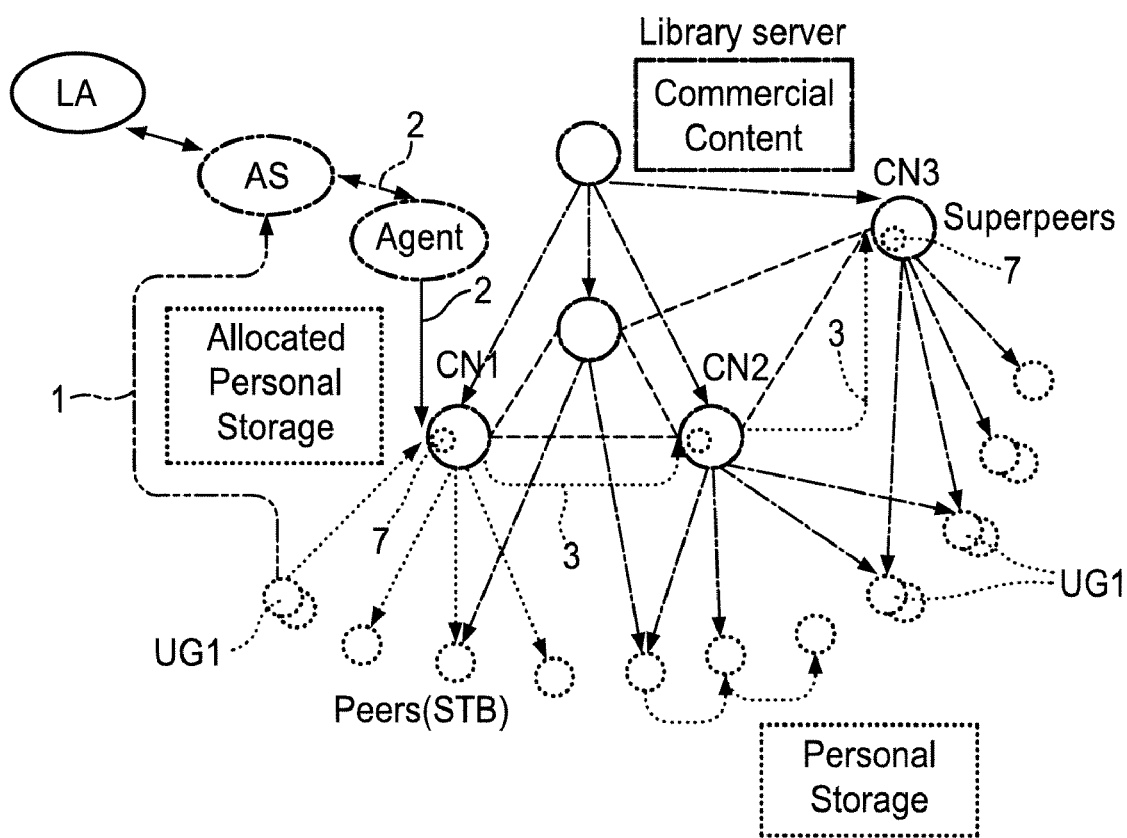
FIG. 1c illustrates another example of the inventive method for distributing high value user originated content over a Internet sP2P network.

In one example, as illustrated in FIG. 1b, content priority and popularity for a given genre are used to define the decision matrix to pro-actively fill the caches. In another example, as illustrated in FIG. 1c, content value is used to provide high service availability, e.g. to reliably distribute infrequently accessed but high value assets such as new mission critical information.

The suggested solution is not restricted to a particular type of user group management and is not limited to a particular decision matrix.

In the Figures after a request for uploading an upload content data package 7 as new user originated content from a requesting user have been received (e.g. received by the AS as a part of an agent network node,), on the first step (step 1) shown as arrows numbered by 1, the new user originated content has been registered at the AS and either has been uploaded or is in the process of being uploaded onto the allocated personal storage at CN1. The user, who registered the content, is a member of the UG1. Therefore, all user group members of the users being member of the current user group UG1 of said requesting user are being looked up in a user group list and the user nodes of said user group members are determined.

The latter second step (step 2) is shown as arrows numbered 2 in the Figures. An agent as another part of the agent network node becomes aware about newly originated content, e.g. by periodically checking information from the application server, by being notified by the AS or by other means. The agent has access to the list of UG1 members, their locations, information about closest accessible caching nodes and their state. The state has a broad meaning and may include, but not be limited to, current load, available and used BW, etc.

On the second step, the agent applies a decision matrix to determine whether new content should be moved to the caches close to other UG1 members. The moving of the new content as a third step is shown by arrows numbered by 3 in the Figures.

So it is determined in which of the caching nodes of the network said upload content data package is to be cached by applying a decision matrix, wherein said decision matrix defines a relationship defining at which caching node content data packages have to be cached for which user node.

In FIG. 1a the upload content data package, i.e. copies thereof, are cached according to the simplest case of the decision matrix, which lists the caching nodes being adjacent to user nodes as the caching nodes the content data packages have to be cached for the user nodes.

Another simple example of the decision matrix can check whether other members of the user group frequently viewed the content for the given genre. Another simple decision matrix can check whether the

CONTENT_PRIORITY>=HIGH_VALUE_PRIORITY, in which case it has to be cached on at least 2 or more nodes accessible to each UG1 member.

An example for the use case for a genre based decision matrix is when a geographically separated family member who uploads a new home movie about children and other family members has frequently in the past requested access to similar user generated genre.

An example for the use case for a priority based decision matrix is when an Internet sP2P reused for sharing mission critical content, e.g. new instructions, which has to be distributed to geographically separated user group members. Even though the instructions may only be accessed a few times, they have to be readily available at the several nearest caching locations.

On the third step (step 3), the agent initiates content movement through caching nodes, as shown by arrows numbered by 3 in the figures. In the given example in FIG. 1a, only a content copy at the nearest caching node (CN3) to UG1 members is kept. The intermediate copies are removed form the caching nodes on the way passing caching node CN2. Members of the UG1 can be optionally notified after the content movement is initiated or completed.

To avoid distribution faults caused by nomadic users the following steps may be performed:

On the step 1, AS before resolving the location of the nearest caches to the UG members can optionally make a call, symbolised by the double head arrow between AS and a Location Agent LA, to the Location Agent to determine the latest locations.

Optionally, e.g. for high value content, the location of the UG members can be re-evaluated periodically. Either pulled by the AS or pushed when LA detects change in location. In this case the steps 2 and 3 can be repeated including cleanup of caches not used any more because a UG member has moved away.

FIG. 1b presents an example with alternative step three. In this case, both CN2 and CN3 will require access to the new UG1 originated content. However, the decision was made to place a copy on CN4 instead.

For example, the decision is made because the genre on the new content does not have high enough popularity density on each of the caching nodes. If $D_n$ is the distance from n-th caching node to the UG1 members reachable by the node, e.g. the distance is measured by number of nodes in between, $R_n$ is the probability of content request from UG1 member.

Then the asset should be cached at one or more node(s) K with the highest weighted popularity density:

$$K \in \approx \underset{N}{\text{MAX}} \sum_{across\_UG\_reachable\_members} \left\{ R_n \frac{1}{D_n} \right\}, n \in 1 \ldots nodes\_in\_the\_path.$$

Meaning the content should be cached in nodes K having a value of the weighted request probability p, defined by the expression in brackets, in a region around the maximum of p of all nodes defining the predefined condition which is fulfilled by the caching nodes where the content data packages are to be cached according to the inventive method.

Therefore, it is taken into account that several peers with multiple access paths can be requesting the same segment, i.e. content data package. So the caching node optimally placed to serve all peers should be selected. This is in a simplified way expressed by the equation.

One of the definitions of "popularity DENSITY" is popularity per number of users. For example, a movie A has been requested 100 times for the Area A and 100 times for the Area B. There are 1000 users in the area A and 10000 in the area B. In this example, in spite of recording the same number of requests, the popularity density would be higher 10 times in the Area A than in the Area B.

FIG. 1c illustrates another example with alternative step three for high value content. In this case when if CONTENTT_PRIORITY>=HIGH_VALUE_PRIORITY content copies must be placed to at least X(x=2) caches accessible to UG1 members for high service availability.

The proposed solution enables the use of an Internet sP2P for efficient distribution of user originated content and improves both efficiency and service quality. It resolves the bottlenecks of content distribution networks known from the prior art.

The solutions overcome limitations of the existing sP2P networks using a 'frequency or requests' pull and cache approach. Properties of the content are also taken into account which allows high service quality and reliability.

A method for distributing content data packages 7 originated by users of a super peer-to-peer network is proposed, wherein the content data packages 7 are to be cached in caching nodes CN1,CN2,CN3,CN4 of said network. The network comprising a plurality of caching nodes CN1,CN2, CN3,CN4 and user nodes 5 of said users and a plurality of data lines that extend between adjacent of said nodes and the users are being grouped in user groups and listed in a user group list. Content data traffic is to be delivered on traffic connections between user nodes 5 of the network.

The method is comprising the steps of:

a) receiving a request for uploading an upload content data package 7 from a requesting user of the users by an agent network node of said network, b) looking up all user group members of the users being member of a current user group UG1 of said requesting user in said user group list and determining the user nodes of said user group members, (also optionally determining current location of the UG members)

c) determining in which of the caching nodes CN1,CN2,CN3, CN4 of the network said upload content data package 7 is to be cached by applying a decision matrix, wherein said decision matrix defines a relationship defining at which caching node content data packages 7 have to be cached for which user node, d) caching said upload content data package 7 in the determined caching nodes CN1,CN2,CN3,CN4.

The invention claimed is:

1. A method for distributing content data packages originated by users of a super peer-to-peer network, wherein the content data packages are to be cached in caching nodes of said network, the network comprising a plurality of caching nodes and user nodes of said users and a plurality of data lines that extend between adjacent caching nodes and user nodes, and the users are being grouped in user groups and listed in a user group list, wherein content data traffic is to be delivered on traffic connections between user nodes of the network, comprising the steps of a) receiving a request for uploading an upload content data package from a requesting user of the users by an agent network node of said network, b) looking up all user group members of the users being member of a current user group of said requesting user in said user group list and determining the user nodes of said user group members, c) determining in which of the caching nodes of the network said upload content data package is to be cached by applying a decision matrix, wherein said decision matrix defines a relationship defining at which caching node content data packages have to be cached for which user node, d) caching said upload content data package in the determined caching nodes.

2. The method according to claim 1, characterized in that the decision matrix lists the caching nodes being adjacent to user nodes as the caching nodes the content data packages have to be cached for the user nodes.

3. The method according to claim 1, characterized in that said user group members are being notified after the caching of said upload content data package is completed.

4. The method according to claim 1, characterized in that the following steps are performed:

assigning a popularity value of said upload content data package to each caching node having at least one user node of said user group members as an adjacent node, calculating a weighted request probability for said upload content data package at each caching node, and that said determining in which of the caching nodes of the network said upload content data package is to be cached by applying said decision matrix is comprising the step of deciding which of the weighted request probabilities of the upload content data package are fulfilling a predefined condition, wherein said determined caching nodes are those at which the weighted request probability of the upload content data package fulfils said predefined condition.

5. The method according to claim 4, further comprising:
for each caching node, combining said popularity value with a distance from the respective caching node to the caching node to which the respective popularity value is assigned to,
wherein the weighted request probability of said upload content data package is calculated by summing up the results of said combining for different caching nodes and/or user nodes.

6. The method according to claim 5, characterized in that the weighted request probabilities for content data packages is requested and/or updated from external sources.

7. The method according to claim 1, characterized in that a content priority value, preferably defining a content value, is assigned to said upload content data package and
said decision matrix defines at which caching node content data packages have to be cached for which user node if said content priority value fulfils a predefined priority condition.

8. The method according to claim 7, characterized in that said decision matrix defines at least two caching nodes the content data package is to be cached for each user node if said content data fulfils said predefined condition.

9. The method according to claim 1, characterized in that step b) and/or step c) are performed by said agent network node.

10. A non-transitory computer-usable data carrier storm instructions that when executed by a computer, cause the computer to perform the method of claim 1.

11. The method according to claim 1, further comprising:
uploading said upload content data packages from the requesting user to the determined caching nodes.

* * * * *